UNITED STATES PATENT OFFICE 2,662,087

2-THIOPHENESERINES AND THEIR METHOD OF MANUFACTURE

Edward C. Hermann, Wilmington, Del., assignor to E. I. du Pont de Nemours and Company, Wilmington, Del., a corporation of Delaware No Drawing. Application August 14, 1950, Serial No. 179,395

11 Claims. (Cl. 260—332.2)

The present invention relates to new chemical compounds, more particularly to thiophene substituted serines represented by the formula, (1) 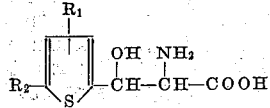

where $R_1$ represents hydrogen or a lower alkyl radical and $R_2$ represents hydrogen, halogen, or lower alkyl radicals. The invention is also directed to processes for obtaining these novel compounds.

By inspection of the above formula which represents the compounds with which this invention is concerned it will be apparent to those skilled in the art that the novel compounds may exist in four optical isomeric forms consisting of two diastereoisomeric pairs, depending upon the spatial arrangement of the polar groups to the two asymmetric carbon atoms with reference to erythrose and threose. The pair of stereoisomers related to erythrose in configuration will be designated as the A series and the pair of stereoisomers related to threose as the B series or form. It is, of course, to be understood that compounds of this invention may well exist as mixtures of the unseparated stereoisomers.

Both the A and B forms of the compounds of the present invention may exist as racemates of optically active dextro and levo rotatory isomers as well as in the form of the individual or separated dextro and levo optical isomers.

In accordance with the invention products having the above formula are produced by condensing 2-thiophenecarboxaldehydes of formula, (2) 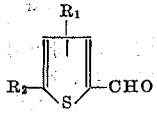

where $R_1$ and $R_2$ have the same significance as given above, with glycine in the presence of an alkali or alkaline earth metal hydroxide, and then treating the resulting compound without isolation with a mineral acid or a liquid carboxylic acid. In addition to obtaining the desired thiophene substituted serine, an amount of the starting 2-thiophenecarboxaldehyde equal to about one-half of the quantity originally employed is recovered.

The substituted 2-thiophenecarboxaldehydes used in the processes of this invention may be prepared by synthetic methods well known to those skilled in the art. A preferred method of synthesis is to react an appropriately substituted thiophene, such as, for example, 2- or 3-methylthiophene, with N-methylformanilide in the presence of a phosphorus oxyhalide.

The condensation of a 2-thiophenecarboxaldehyde of Formula 2 with glycine is carried out in a suitable basic medium such as an aqueous solution of an alkali or alkaline earth metal hydroxide. The preferred medium is aqueous sodium hydroxide, for example, 6 N NaOH solution. It is preferred, of course, to use a hydroxide in which the metallic constituent of the hydroxide is one which, upon reaction with the anionic constituent of the acidic reagent used in the last step of the process of this invention, and which is described below, will not result in the formation of an undesirable, insoluble salt, such as, for example, barium sulfate. The initial condensation can, in general, be carried out at a temperature varying from about 0–50° C. but the preferred temperature for the reaction is between about 25–30° C.

The products obtained by condensing the already described 2-thiophenecarboxaldehydes with glycine are believed to have the formula, (3) 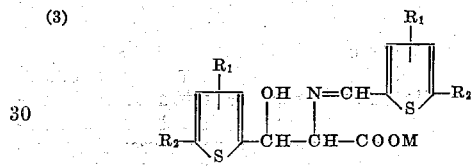

where $R_1$ and $R_2$ are the same as set forth above, and M is selected from the group consisting of alkali and alkaline earth metals. For purposes of this invention it has not been found necessary to isolate the intermediate compound which I believe is represented by Formula 3.

The product resulting from the above-described condensation is then treated, without being isolated, with an acid to obtain equal molecular quantities of the desired substituted serine represented by Formula 1 and the 2-thiophenecarboxaldehyde initially used (Formula 2). The quantity of acid which is employed in the process of this invention is at least sufficient to neutralize the hydroxide used initially in the reaction. While it is preferred to use a strong mineral acid, monocarboxylic acids which are liquids at room temperature, such as, for example, acetic acid, chloroacetic acid, propionic acid and the like, may be employed. The neutralization, i. e., the acid treatment of the product produced by the alkaline condensation of glycine with the 2-thiophenecarboxaldehyde, can, in general, be performed at temperatures up to but not exceeding 50° C. The preferred temperature for the neutralization is between about 20–30° C.

A 2-thiophenecarboxaldehyde represented by Formula 2 and obtained upon treating an intermediate compound of Formula 3 with acid is recoverable, and may be readily reused in the initial condensation. In instances where continuous operation is desired, it will be highly advantageous at least from an economic standpoint to continuously recycle the aldehyde of Formula 2. For batchwise operation, I prefer to recover the 2-thiophenecarboxaldehyde represented by Formula 2 by extracting the aqueous solution from which the desired thiopheneserine of Formula 1 has been removed by filtration with a solvent such as diethyl ether. The ethereal extracts are then dried. Recovery of the 2-thiophenecarboxaldehyde is completed by distilling the dried extracts under reduced pressure, and collecting the fractions boiling at the proper range.

The above-described process of my invention may be diagrammatically illustrated as follows:

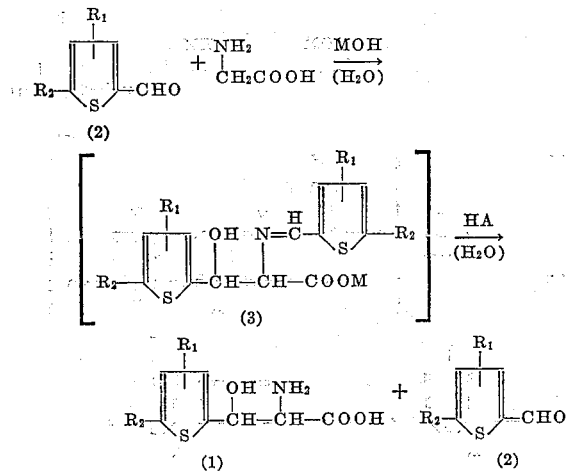

where $R_1$, $R_2$, and M have the same significance as above and HA is selected from group consisting of mineral acids and monocarboxylic acids which are liquid at room temperature.

The thiophene substituted serines obtained by the process of the present invention are useful as intermediates in the preparation of other organic compounds, particularly the thienyl amido-1,3-propanediols, claimed in my copending application, Serial No. 172,393, filed July 6, 1950, and now abandoned. Some of the compounds of the present invention have been found to possess definite antibacterial activity against gram-positive microorganisms.

In order that my invention may be better understood, reference should be had to the following illustrative examples.

EXAMPLE 1

*Preparation of 2-thiopheneserine*

To a stirred mixture consisting of 15.0 grams of glycine and 50 ml. of 6 N aqueous sodium hydroxide there is added 42.0 grams of 2-thiophenecarboxaldehyde in a dropwise fashion over a period of about seven minutes. The temperature of the reaction mixture is maintained at 26–30° C. by cooling with a water bath during the addition of the 2-thiophenecarboxaldehyde. The reaction mixture is then stirred until such time as the mixture sets up to a yellow paste. The formation of such a paste usually occurs in about 12 to 14 minutes after all of the aldehyde has been added. The paste containing a compound which I believe may be represented by the formula,

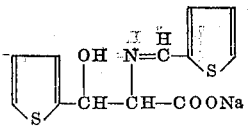

is allowed to stand for a period of about 50 minutes at room temperature.

To the unisolated paste there is added 25 ml. of concentrated hydrochloric acid, the temperature of the reaction mixture being maintained at about 25 to 30° C. during this neutralization. The reaction mixture is stirred at room temperature for a period of about 30 minutes. The resulting solid is separated by filtration, washed with 60 ml. of water and with four 40 ml. portions of ether. The filtrate and washings are saved for the recovery of 2-thiophenecarboxaldehyde. The crude product is air-dried, and further purified by recrystallization from aqueous ethyl alcohol (1 part water to 3 parts alcohol). The purified 2-thiopheneserine, which is believed to be mainly the (dl)-B form, is crystalline and melts at 175° C. with decomposition. It has the formula,

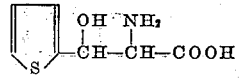

Analysis calculated for $C_7H_9O_3NS$: C, 44.91; H, 4.84; N, 7.48. Found: C, 44.99; H, 5.11; N, 7.49.

The free 2-thiophenecarboxaldehyde present in the reaction mixture at the end of the reaction period may be recovered by the following procedure: The filtrate obtained in the separation of the crude 2-thiopheneserine is extracted with ether, the ether extract being combined with the ethereal washings. The combined ethereal solutions are dried with anhydrous sodium sulfate, and the ether is then removed by distillation under reduced pressure followed by distillation of the residual material under reduced pressure. The fraction boiling at 96–97° C. at a pressure of 30 mm. is 2-thiophenecarboxaldehyde.

EXAMPLE 2

*Preparation of 5-methyl-2-thiopheneserine*

5-methyl-2-thiophenecarboxaldehyde is prepared by the reaction of 2-methylthiophene and N-methylformanilide in the presence of phosphorus oxychloride in accordance with the directions of King and Nord (J. Org. Chem. 13, 635 (1948)).

47.3 grams of 5-methyl-2-thiophenecarboxaldehyde is added dropwise to a stirred mixture consisting of 15.0 grams of glycine and 50 ml. of 6 N aqueous sodium hydroxide over a period of about 10 minutes. The temperature of the reaction mixture is maintained at 25–30° C. throughout the period. The reaction mixture is then stirred until it turns to a paste. After the paste has been allowed to stand at room temperature for about one hour, 25 ml. of concentrated hydrochloric acid is slowly mixed with it, the temperature of the resulting mixture being maintained at 25–30° C. The mixture is then stirred at room temperature for a period of about 30 minutes. The resulting solid is separated by filtration, washed with 50 ml. of water and with four 50 ml. portions of ether. The filtrate and washings are saved for recovery of 5-methyl-2-thiophenecarboxaldehyde. The solid product consisting mainly of 5-methyl-2-thiopheneserine is air-dried.

It may be further purified by recrystallization from a 1:3 mixture of water and ethanol. The recrystallization is preferably performed by dissolving the material in a minimum amount of boiling water, adding about 3 volumes of absolute ethanol to the aqueous solution, and allowing the resulting aqueous ethanolic solution to cool at a temperature of 0–4° C. for a period of about twelve hours. The 5-methyl-2-thiopheneserine thus obtained has the formula,

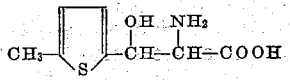

The free 5-methyl-2-thiophenecarboxaldehyde present in the reaction mixture at the end of the reaction period may be recovered by a method similar to that outlined for the recovery of 2-thiophenecarboxaldehyde in Example 1.

EXAMPLE 3

*Preparation of 3-methyl-2-thiopheneserine*

3-methyl-2-thiophenecarboxaldehyde is prepared by the reaction of 3-methylthiophene and N-methylformanilide in the presence of phosphorus oxychloride according to the directions of King and Nord (J. Org. Chem. 13, 635 (1948)).

The preparation of 3-methyl-2-thiopheneserine is carried out in a manner identical with the procedure of Example 2 using 47.3 g. of 3-methyl-2-thiophenecarboxaldehyde and the same quantities of reagents specified in Example 2.

The 3-methyl-2-thiopheneserine so obtained has the formula,

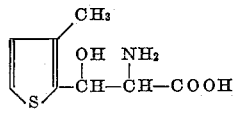

The free 3-methyl-2-thiophenecarboxaldehyde present in the reaction mixture at the end of the reaction period may be recovered by a method similar to that outlined for the recovery of 2-thiophenecarboxaldehyde in Example 1.

EXAMPLE 4

*Preparation of 5-bromo-2-thiopheneserine*

5-bromo-2-thiophenecarboxaldehyde is prepared by the reaction of 2-bromothiophene and N-methylformanilide in the presence of phosphorus oxybromide according to the directions of King and Nord (J. Org. Chem. 14, 405 (1949)).

71.6 g. of 5-bromo-2-thiophenecarboxaldehyde is added dropwise to a stirred mixture consisting of 15.0 g. of glycine and 50 ml. of 6 N aqueous sodium hydroxide over a period of about 10 minutes, the temperature of the reaction mixture being maintained at 25–30° C. The reaction mixture is then stirred until it turns to a paste. After the paste has been allowed to stand at room temperature for about one hour, 25 ml. of concentrated hydrochloric acid is slowly added to it, the temperature of the mixture being maintained at 25–30° C. The mixture is then stirred at room temperature for a period of about 30 minutes. A solid which has resulted is separated by filtration, washed with 50 ml. of water and with four 50 ml. portions of ether. The filtrate and washings are saved for recovery of 5-bromo-2-thiophenecarboxaldehyde. The solid product consisting of 5-bromo-2-thiopheneserine is air-dried. It may be purified by recrystallizing from aqueous ethanol in a manner identical with that described in Example 2. The product so obtained has the formula,

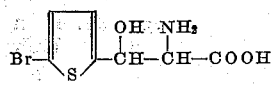

The free 5-bromo-2-thiophenecarboxaldehyde present in the reaction mixture at the end of the reaction period may be recovered by a method similar to that outlined for the recovery of 2-thiophenecarboxaldehyde in Example 1.

I claim:

1. A compound of the formula,

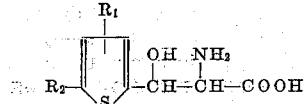

where $R_1$ is a member of the class consisting of hydrogen and lower alkyl radicals, and $R_2$ is a member of the class consisting of hydrogen, halogen and, lower alkyl radicals.

2. 2-thiopheneserine a compound represented by the formula

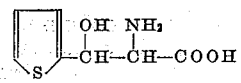

3. A process which comprises the steps of reacting a compound of the formula,

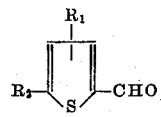

where $R_1$ is a member of the class consisting of hydrogen and lower alkyl radicals, and $R_2$ is a member of the class consisting of hydrogen, halogen and, lower alkyl radicals, with glycine in the presence of a hydroxide of a metal selected from the group consisting of alkali and alkaline earth metals, and subjecting the compound thus formed to an acidic condition, and separating from the mixture of products so produced a compound of formula,

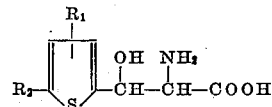

where $R_1$ and $R_2$ have the same significance as above.

4. A process of claim 3 in which a compound of formula,

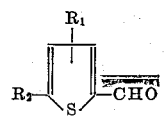

where $R_1$ and $R^2$ have the same significance as in claim 3, is recovered from said mixture of products.

5. In a process for obtaining 2-thiopheneserine, the steps comprising condensing 2-thiophenecarboxaldehyde with glycine in the presence of aqueous sodium hydroxide, thereafter treating with mineral acid the alkaline medium containing the product formed by condensing said 2-thiophenecarboxaldehyde with said glycine to obtain a mixture consisting of 2-thiopheneserine and 2-thiophenecarboxyaldehyde, and isolating said 2-thiopheneserine therefrom.

6. 3-methyl-2-thiopheneserine.

7. 5-methyl-2-thiopheneserine.

8. 5-bromo-2-thiopheneserine.

9. In a process for obtaining 3-methyl-2-thiopheneserine, the steps comprising condensing 3-methyl-2-thiophene-carboxaldehyde with glycine in the presence of an aqueous sodium hydroxide, thereafter treating with mineral acid the alkaline medium containing the product formed by condensing said 3-methyl-2-thiophenecarboxaldehyde with said glycine to obtain a mixture consisting of 3-methyl-2-thiopheneserine and 3-methyl-2-thiophenecarboxaldehyde and isolating said 3-methyl-2-thiopheneserine therefrom.

10. In a process for obtaining 5-methyl-2-thiopheneserine, the steps comprising condensing 5-methyl-2-thiophenecarboxaldehyde with glycine in the presence of an aqueous sodium hydroxide, thereafter treating with mineral acid the alkaline medium containing the product formed by condensing said 5-methyl-2-thiophenecarboxaldehyde with said glycine to obtain a mixture consisting of 5-methyl-2-thiopheneserine and 5-methyl-2-thiophenecarboxaldehyde and isolating said 5-methyl-2-thiopheneserine therefrom.

11. In a process for obtaining 5-bromo-2-thiopheneserine, the steps comprising condensing 5-bromo-2-thiophenecarboxaldehyde with glycine in the presence of aqueous sodium hydroxide, thereafter treating with mineral acid the alkaline medium containing the product formed by condensing said 5-bromo-2-thiophenecarboxaldehyde with said glycine to obtain a mixture consisting of 5-bromo-2-thiopheneserine and 5-bromo-2-thiophenecarboxaldehyde and isolating therefrom the said 5-bromo-2-thiopheneserine.

EDWARD C. HERMANN.

References Cited in the file of this patent

Erlenmeyer: Liebig's Annalen, 284, 36–46 (1895).

Steinkopf: Die Chemie des Thiophens, page 21, Edwards Lithoprint, 1941.

Whitmore: Organic Chemistry, pp. 884, 893, Van Nostrand, N. Y., 1937.

Bernthsen and Sudborough, Organic Chemistry, page 549, Van Nostrand, N. Y., 1925.

Richter: Organic Chemistry, pp. 649, 650, Wiley, N. Y., 1938.

Williams: Detoxication Mechanisms, pp. 194, 197, 198, Wiley, N. Y., 1947.

Lands: Proc. Soc. Exp. Biol. Med. 57, 55–6 (1944).

Alles: J. Pharm. Exp. Ther. 72, 265 (1941).

Powers: Advancing Fronts in Chemistry, vol. II, page 33, Reinhold Pub. Co., N. Y., 1946.

Caesar and Sachanen: Ind. Eng. Chem. 40, 922 (1948).

Le Suer, W. M.: 3-Substituted Thiophenes, page 2, doctorate thesis, Indiana University, January 1948. Ind. Univ. Library Call No. QD1000.L644.

Ex parte Bywater, 83 USPQ 4.